US011805010B2

(12) United States Patent
Saad et al.

(10) Patent No.: US 11,805,010 B2
(45) Date of Patent: Oct. 31, 2023

(54) SIGNALING IP PATH TUNNELS FOR TRAFFIC ENGINEERING

(71) Applicant: Juniper Networks, Inc., Sunnyvale, CA (US)

(72) Inventors: Tarek Saad, Ottawa (CA); Raveendra Torvi, Nashua, NH (US); Vishnu Pavan Beeram, Ashburn, VA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/588,072

(22) Filed: Sep. 30, 2019

(65) Prior Publication Data

US 2020/0403861 A1    Dec. 24, 2020

Related U.S. Application Data

(60) Provisional application No. 62/865,771, filed on Jun. 24, 2019, provisional application No. 62/864,754, filed on Jun. 21, 2019.

(51) Int. Cl.
*H04L 41/0806* (2022.01)
*H04L 41/0668* (2022.01)
(Continued)

(52) U.S. Cl.
CPC ...... *H04L 41/0806* (2013.01); *H04L 41/0668* (2013.01); *H04L 45/745* (2013.01);
(Continued)

(58) Field of Classification Search
None
See application file for complete search history.

(56) References Cited

U.S. PATENT DOCUMENTS 7,626,925 B1   12/2009  Sivabalan et al.
7,684,420 B2   3/2010   Li
(Continued)

FOREIGN PATENT DOCUMENTS

CN    1705292 A      12/2005
CN    103368843 A    10/2013
(Continued)

OTHER PUBLICATIONS

Response to the Extended Search Report dated May 7, 2020 from counterpart European Application No. 19213947.5, filed Jun. 23, 2021, 19 pp.
(Continued)

*Primary Examiner* — Andre Tacdiran
(74) *Attorney, Agent, or Firm* — Shumaker & Sieffert, P.A.

(57) ABSTRACT

In general, techniques are described for signaling IP path tunnels for traffic engineering using constraints in an IP network. For example, network devices, e.g., routers, of an IP network may compute an IP path using constraint information and establish the IP path using, for example, Resource Reservation Protocol, to signal the IP path without using MPLS. As one example, the egress router generates a path reservation signaling message that includes an egress IP address that is assigned for use by the routers on the IP path to send traffic of the data flow by encapsulating the traffic with the egress IP address and forwarding toward the egress router. As each router in the IP path receives the path reservation signaling message, the router configures a forwarding state to forward traffic encapsulated with the egress IP address to a next hop along the IP path toward the egress router.

20 Claims, 8 Drawing Sheets

(51) Int. Cl.

| | |
|---|---|
| *H04L 45/745* | (2022.01) |
| *H04L 47/125* | (2022.01) |
| *H04L 47/724* | (2022.01) |
| *H04L 61/2592* | (2022.01) |
| *H04L 47/10* | (2022.01) |
| *H04L 61/5007* | (2022.01) |
| *H04L 45/50* | (2022.01) |

(52) U.S. Cl.
CPC ............ *H04L 47/10* (2013.01); *H04L 47/125* (2013.01); *H04L 47/724* (2013.01); *H04L 61/2592* (2013.01); *H04L 61/5007* (2022.05); *H04L 45/50* (2013.01)

(56) References Cited

U.S. PATENT DOCUMENTS

| | | | | |
|---|---|---|---|---|
| 2003/0084219 | A1* | 5/2003 | Yao | H04L 61/2596 710/300 |
| 2004/0004955 | A1* | 1/2004 | Lewis | H04L 12/4633 370/468 |
| 2004/0047366 | A1* | 3/2004 | Chowdhury | H04L 47/824 370/466 |
| 2004/0109455 | A1* | 6/2004 | Jouppi | H04W 28/24 370/395.21 |
| 2004/0114595 | A1* | 6/2004 | Doukai | H04L 45/00 370/389 |
| 2005/0262264 | A1* | 11/2005 | Ando | H04L 45/00 709/233 |
| 2009/0279544 | A1 | 11/2009 | Ayanampudi et al. | |
| 2010/0118872 | A1* | 5/2010 | Shirai | H04L 12/43 370/389 |
| 2010/0189115 | A1 | 7/2010 | Kitada | |
| 2011/0128969 | A1* | 6/2011 | Scholl | H04L 45/50 370/466 |
| 2012/0044936 | A1* | 2/2012 | Bellagamba | H04L 45/02 370/392 |
| 2012/0195229 | A1* | 8/2012 | Chen | H04L 45/12 370/254 |
| 2015/0103691 | A1 | 4/2015 | Bhattacharya et al. | |
| 2015/0124821 | A1* | 5/2015 | Chu | H04L 45/22 370/392 |
| 2015/0249593 | A1* | 9/2015 | Alvarez | H04L 45/124 370/241 |
| 2016/0119221 | A1* | 4/2016 | Tochio | H04L 45/02 398/52 |
| 2016/0119223 | A1* | 4/2016 | Ramachandran | H04L 45/28 370/219 |
| 2017/0019331 | A1* | 1/2017 | Yong | H04L 45/22 |
| 2019/0207803 | A1* | 7/2019 | Kalburgi | H04L 45/28 |
| 2019/0297013 | A1* | 9/2019 | Xin | G06F 9/546 |

FOREIGN PATENT DOCUMENTS

| | | |
|---|---|---|
| EP | 2645640 A2 | 10/2013 |
| WO | WO2015154481 * | 10/2015 |

OTHER PUBLICATIONS

Parrel et al., "Encoding of Attributes for MPLS LSP Establishment Using Resource Reservation Protocol Traffic Engineering (RSVP-TE)," Network Working Group, RFC 5420, Feb. 2009, 22 pp.
Amante et al. "IPv6 Flow Label Specification" Internet Engineering Task Force (IETF), RFC 6437, Nov. 2011, 15 pp.
Dreibholz, T. "An IPv4 Flowlabel Option" draft-dreibholz-ipv4-flowlabel-29, Network Working Group, Internet-Draft, Mar. 6, 2019, 9 pp.
Awduche et al., RFC 3209, "RSVP-TE: Extensions to RSVP for LSP Tunnels," Network Working Group, Dec. 2001, 57 pp.
Marques et al., "Dissemination of Flow Specification Rules," Network Working Group, RFC 5575, Aug. 2009, 23 pp.
Extended Search Report from counterpart European Application No. 19213947.5, dated May 7, 2020, 8 pp.
Davie et al., "Support for RSVP in Layer 3 VPNs; draft-ietf-tsvwg-rsvp-13vpn-00," Network Working Group, Internet-Draft, Jul. 3, 2008, 32 pp.
First Office Action and Search Report, and translation thereof, from counterpart Chinese Application No. 201911410823.0 dated Nov. 3, 2021, 20 pp.
Office Action, and translation thereof, from counterpart Chinese Application No. 201911410823.0 dated Jul. 8, 2022, 26 pp.
Communication pursuant to Article 94(3) EPC from counterpart European Application No. 19213947.5 dated Oct. 27, 2022, 8 pp.
Davie et al., "Support for RSVP in Layer 3 VPNs; draft-ietf-tsvwg-rsvp-13vpn-00", Network Working Group, Internet-Draft, Jul. 2008, 32 pp.
Response to Communication pursuant to Article 94(3) EPC dated Oct. 27, 2022, from counterpart European Application No. 19213947.5 filed Feb. 23, 2023, 19 pp.
Bonica et al., Label Switched Path (LSP) Self-Ping, Internet Engineering Task Force (IETF), Request for Comments: 7746, 12 pp., ISSN: 2070-1721 (Year: 2016).
Imaizumi et al., "An alternative approach to multi-path forwarding on IPv6 networks," 20th International Conference on Advanced Information Networking and Applications—vol. 1 (AINA'06), Vienna, Austria, 2006, 5 pp., doi: 10.1109/AINA.2006.79. (:Year: 2006).
Imaizumi, et al. "FMEHR: an alternative approach to multi-path forwarding on packet switched networks," 2005 13th IEEE International Conference on Networks Jointly held with the 2005 IEEE 7th Malaysia International Conference on Communication, Kuala Lumpur, Malaysia, 2005, 6 pp., doi: 10.1109/ICON.2005.16.
Office Action from U.S. Appl. No. 18/148,769 dated Apr. 12, 2023, 10 pp.
Response to Office Action dated Apr. 12, 2023 from U.S. Appl. No. 18/148,769, filed Jul. 12, 2023, 9 pp.
Notice of Allowance from U.S. Appl. No. 18/148,769 dated Jul. 26, 2023, 7 pp.

* cited by examiner

SIGNALING IP PATH TUNNELS FOR TRAFFIC ENGINEERING

This application claims the benefit of U.S. Provisional Patent Application No. 62/864,754 filed on Jun. 21, 2019 and U.S. Provisional Patent Application No. 62/865,771 filed on Jun. 24, 2019, the entire contents of both of which are incorporated by reference herein.

TECHNICAL FIELD

The disclosure relates to computer networks and, more specifically, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines information within the packet and forwards the packet in accordance with the accumulated topology information.

In some examples, routers may implement one or more traffic engineering protocols to establish tunnels for forwarding packets through a selected path. For example, Multi-Protocol Label Switching (MPLS) is a mechanism used to engineer traffic patterns within Internet Protocol (IP) networks according to the routing information maintained by the routers in the network. By utilizing MPLS protocols, such as Resource Reservation Protocol with Traffic Engineering extensions (RSVP-TE) or Source Packet Routing in Networking (SPRING) with traffic extensions (SR-TE), routers can disseminate labels associated with destinations to forward traffic along a particular path through a network to a destination device, i.e., a Label Switched Path (LSP), using labels prepended to the traffic. RSVP-TE or SR-TE may use constraint information, such as bandwidth availability, to compute paths and establish LSPs along the paths within a network. RSVP-TE or SR-TE may use bandwidth availability information accumulated by an IGP link-state routing protocol, such as an Intermediate System-Intermediate System (IS-IS) protocol or an Open Shortest Path First (OSPF) protocol. In some configurations, the routers may also be connected by an IP infrastructure in which case IP-in-IP or Generic Routing Encapsulation (GRE) tunneling or other IP tunneling can be used between the routers. However, such traffic engineering mechanisms have hardware requirements or hardware limitations to realize traffic engineering in IP networks.

SUMMARY

In general, techniques are described for signaling IP path tunnels for traffic engineering using constraints in an IP network. For example, network devices, e.g., routers, of an IP network may compute an IP path tunnel (referred to herein as "IP path") using constraint information and establish the IP path using, for example, Resource Reservation Protocol (RSVP), to signal the IP path without using MPLS.

In one example implementation, an ingress router of the IP network may compute an IP path towards an egress router of the IP network using constraint information, such as bandwidth availability. To signal the IP path, the ingress router may generate a path signaling message of a resource reservation protocol, e.g., RSVP PATH message, that includes path identification information associated with the IP path. For example, the path identification information of the RSVP PATH message may include an Explicit Route Object (ERO) that specifies per-hop attributes (i.e., next-hops) for the IP path and the requested constraint. In some instances, the path identification information of the RSVP PATH message may also include a flow label associated with the IP path that the ingress router may use to encapsulate a packet to be steered on the IP path. The ingress router sends the RSVP PATH message downstream toward the egress router according to the ERO. Each router along the IP path (e.g., transit routers) receives the RSVP PATH message and forwards the RSVP PATH message downstream if the router has resources for the IP path. When the egress router receives the RSVP PATH message, the egress router generates a path reservation signaling message, e.g., RSVP reservation (RESV) message, that includes an IP address of the egress router (referred to herein as "egress IP address"). The egress IP address is assigned for use by the routers on the IP path to send traffic of the data flow identified by the flow label by encapsulating the traffic with the egress IP address and forwarding toward the egress router. The egress router may send the RSVP RESV message in the reverse order of the IP path specified by the ERO. As each router in the IP path receives the RSVP RESV message, the router may configure forwarding information of the router to forward traffic encapsulated with the egress IP address to a next hop along the IP path toward the egress router.

When the ingress router receives a packet destined for a destination network reachable by the egress router, the ingress router may inject the packet into the IP network with the egress IP address (and in some instances the flow label) as a packet header. When each of the transit routers receives the packet, the transit router may perform a lookup of its forwarding information based on the packet header and send the packet toward the egress router via an outgoing interface associated with the egress IP address. When the egress router receives the packet, the egress router may de-encapsulate the packet header and forward the packet toward the destination network.

In another example implementation, the routers of the IP network may additionally, or alternatively, configure a bypass path to protect the IP path. For example, a subset of routers of the IP path may establish a bypass path such that in the event a link and/or node on the IP path fails, the subset of routers may be configured to steer traffic to the bypass path. To explicitly signal the bypass path, a router at the point of local repair (e.g., the router that is to provide the bypass path for link or node protection) and a router where the bypass path and the IP path merge (referred to herein as "merge point router") may signal a bypass path using a resource reservation protocol, e.g., RSVP. In one example, the router at the point of local repair (e.g., a router upstream of a failed link) and the merge point router (e.g., a router downstream of the failed link) may establish a link bypass path to each other to steer traffic on the link bypass path in the event of a link failure. In another example, the router at the point of local repair (e.g., a router upstream of a failed node) and the merge point router (e.g., a router downstream of the failed node) may establish a node protection bypass (or next-to-next-hop bypass) path to each other to steer traffic on the node bypass path in the event of a node failure.

As one example, the point of local repair router may send an RSVP PATH message including an ERO that specifies per-hop attributes of the bypass path. The merge point router may send an RSVP RESV message that specifies its IP address (referred to herein as "merge point IP address"). When the point of local repair router receives the RSVP RESV message, the point of local repair router may store the routing information and configure, in the event a link and/or node failure is detected, forwarding information of the point of local repair router to send a packet toward the merge point router via an outgoing interface associated with the merge point IP address (e.g., the bypass tunnel). In this way, when the point of local repair router receives a packet to be forwarded along the IP path and its outgoing link for the IP path has failed, the point of local repair router may steer the packet along the bypass path rather than along the IP path. For example, the point of local repair router may encapsulate the merge point IP address as a packet header to the packet to steer the packet along the bypass path toward the merge point router. When the merge point router receives the packet, the merge point router may de-encapsulate the packet header, perform a lookup of its forwarding information based on the current packet header (e.g., the egress IP address), and send the packet toward the egress router via the IP path.

In one example, a method includes sending, by a network device of a plurality of network devices of an Internet Protocol (IP) network, a path signaling message of a resource reservation protocol toward an egress network device of the IP network to establish an IP path in the IP network, wherein the path signaling message includes path identification information associated with the IP path that causes the plurality of network devices to steer traffic on the IP path. The method also includes receiving, by the network device, a path reservation signaling message of the resource reservation protocol including an IP address of the egress network device. The method further includes configuring, by the network device and in response to receiving the path reservation signaling message, forwarding information of the network device to forward a packet on the IP path toward the egress network device.

In another example, a network device of an Internet Protocol (IP) network includes a memory. The network device also includes one or more processors in communication with the memory, wherein the one or more processors are configured to: send a path signaling message of a resource reservation protocol toward an egress network device of the IP network to establish an IP path in the IP network, wherein the path signaling message includes path identification information associated with the IP path that causes a plurality of network devices of the IP network to steer traffic on the IP path; receive a path reservation signaling message of the resource reservation protocol including an IP address of the egress network device; and configure, in response to receiving the path reservation signaling message, forwarding information of the network device to forward a packet on the IP path toward the egress network device.

In another example, a method includes receiving, by an egress network device of a plurality of network devices of an Internet Protocol (IP) network, a path signaling message to establish an IP path from an ingress network device of the IP network to the egress network device, wherein the path signaling message includes path information associated with the IP path that causes one or more transit network devices of the plurality of network devices to establish the IP path. The method also includes generating, by the egress network device, a path reservation signaling message including an IP address of the egress network device selected from a set of IP addresses and assigned to the IP path. The method further includes sending, by the egress network device, the path reservation signaling message and to the one or more of the transit network devices to cause each of the one or more transit network devices and the ingress network device to configure a forwarding state to forward a packet on the IP path toward the egress network device.

The techniques described herein may provide one or more technical advantages that realize a practical application. For example, by explicitly signaling IP path tunnels using a resource reservation protocol such as RSVP, routers of an IP network may perform traffic engineering using constraints without using MPLS protocols, such as RSVP-TE and SR-TE, that require new hardware or data plane support to provide traffic engineering. Moreover, the techniques described herein natively support IP forwarding for both IPv4 and IPv6, and therefore avoid the use of traffic engineering mechanisms that support only IPv4 or only IPv6. By performing one or more aspects of the techniques described herein, routers of an IP network may also avoid using IP-in-IP or GRE tunneling mechanisms that have limitations to the number of encapsulations and do not provide bandwidth guarantees. One or more aspects of the techniques described herein may also provide re-routing procedures (e.g., fast re-route) with little to no changes and without the need for loop-free alternate routing. Additionally, make-before-break procedures with RSVP (e.g., for IP path replacement or bandwidth resizing) can be implemented with little to no changes.

The details of one or more examples are set forth in the accompanying drawings and the description below. Other features, objects, and advantages of the disclosure will be apparent from the description and drawings, and from the claims.

The details of one or more examples are set forth in the accompanying drawings and the description below. Other features, objects, and advantages will be apparent from the description and drawings, and from the claims.

DETAILED DESCRIPTION

Figure 1:
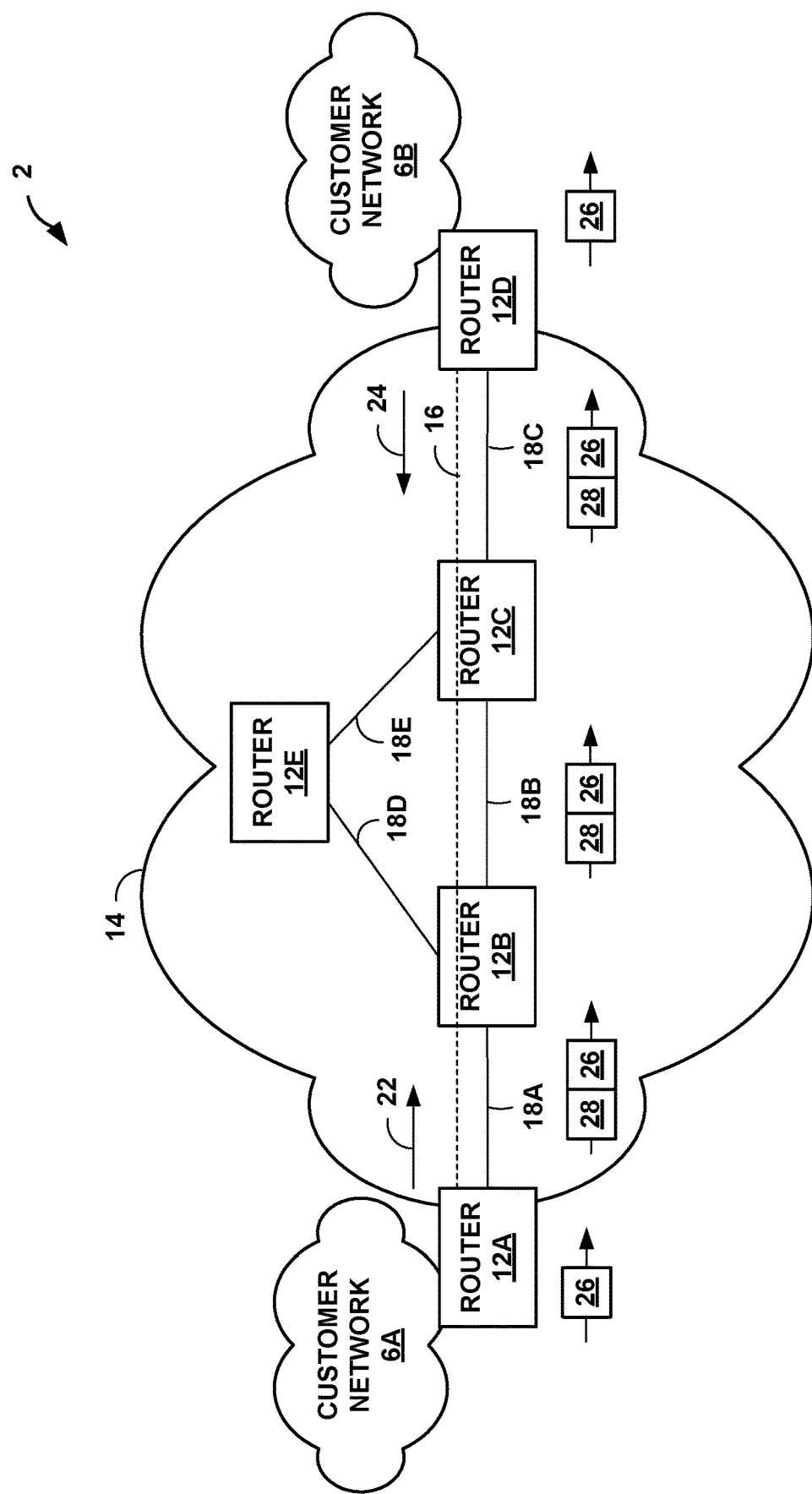
FIG. 1 is a block diagram illustrating an example network system in which network devices signal explicit IP path tunnels for traffic engineering using constraints in an IP network, in accordance with one or more aspects of the techniques described in this disclosure.

FIG. 1 is a block diagram illustrating an example network system 2 in which network devices signal explicit IP path tunnels for traffic engineering using constraints in an Internet Protocol (IP) network, in accordance with one or more aspects of the techniques described in this disclosure. In the example of FIG. 1, network 14 may include network devices, such as routers 12A-12E (collectively, "routers 12"), to establish one or more Internet Protocol (IP) paths across one or more links, e.g., links 18A-18E (collectively, "links 18").

In some examples, network 14 may be a service provider network. For example, network 14 may represent one or more networks owned and operated by a service provider (which is commonly a private entity) that offer one or more services for consumption by customers or subscribers of customer networks 6A-6B (collectively, "customer networks 6"). In this context, network 14 is typically a layer 3 (L3) packet-switched network that provides L3 connectivity between a public network, such as the Internet, and one or more customer networks 6. Often, this L3 connectivity provided by service provider network 14 is marketed as a data service or Internet service, and subscribers in customer networks 6 may subscribe to this data service. Network 14 may represent an L3 packet-switched network that provides data, voice, television and any other type of service for purchase by subscribers and subsequent consumption by the subscribers in customer networks 6. In the illustrated example of FIG. 1, network 14 may comprise a network infrastructure that supports the Internet Protocol and may be referred to herein as IP network 14.

Customer networks 6 may be local area networks (LANs), wide area networks (WANs), or other private networks that include a plurality of subscriber and/or customer devices (not shown). In some examples, customer networks 6 may comprise distributed network sites of the same customer enterprise. In other examples, customer networks 6 may belong to different entities. Subscriber and/or customer devices (not shown) within customer network 6 may include personal computers, laptops, workstations, personal digital assistants (PDAs), wireless devices, network-ready appliances, file servers, print servers or other devices capable of requesting and receiving data via network 14. While not shown in the example of FIG. 1, network system 2 may include additional service provider networks, customer networks and other types of networks, such as access networks, private networks, or any other type of network.

Routers 12 represent any network device that routes or otherwise forwards traffic through network 14 by performing IP-based forwarding, such as encapsulating IP addresses and de-encapsulating IP addresses. Typically, routers 12 represent an L3 packet-switching device that operates at L3 to exchange routing information that describes a current topology of network 14 using a routing protocol, such as an Interior Gateway Protocol (IGP) or a Border Gateway Protocol (BGP). Routers 12 then process this routing information, selecting paths through its representation of the topology of network 12 to reach all available destinations to generate forwarding information. In other words, routers 12 reduce these paths to so-called "next hops" which identify interfaces to which to forward packets destined for a particular destination, where the forwarding information includes this list of next hops. Routers 12 then install this forwarding information in a forwarding component of the router, whereupon the forwarding component forwards received traffic in accordance with the forwarding information. In general, the forwarding component may be any component for forwarding packets between interfaces of the router, such as forwarding circuits or processors programmed with forwarding tables.

In the illustrated example of FIG. 1, routers 12 may establish one or more IP paths, e.g., IP path 16 (represented as a dashed line). Router 12A may represent an ingress router of IP path 16 and router 12D may represent an egress router of IP path 16. Router 12B, 12C, are intermediate or transit routers along IP path 16. IP path 16 may represent a flow of traffic along the IP path from ingress router 12A to egress router 12D. All network traffic sent on IP path 16 must follow the established path. In the example of FIG. 1, IP path 16 is established across links 18A-18C. The configuration of network system 2 is merely an example. For example, network system 2 may include any number of transit routers and IP paths. Nonetheless, for ease of description, only routers 12A-12D are illustrated in the example of FIG. 1.

In some examples, IP paths may be established based on constraint information. Constraint information may include, for example, reserved bandwidth availability, latency, service disjointness, Shared Rink Link Group (SRLG), and others. In some instances, network devices may advertise constraint information using, for example, IGP, such as the Intermediate System-Intermediate System (IS-IS) protocol or the Open Shortest Path First (OSPF) protocol to configure an IP path. Based on the advertised constraint information, routers may in some instances establish IP paths using Generic Route Encapsulation (GRE) or IP-in-IP tunneling protocols to establish traffic engineered tunnels based on the advertised constraints. However, network devices that implement IP-in-IP or GRE encapsulations are limited in the number of IP/GRE headers (e.g., based on the number of routers along the path) that an ingress router may push to realize an end-to-end constrained path. For example, the IP/GRE headers each occupy a specific number of bytes (e.g., IP header may occupy 20-bytes; IP in GRE encapsulation may occupy 24-bytes). Because the ingress router pushes an IP/GRE header for each router that the traffic is to traverse, this requires additional processing for each router for the constrained path. Moreover, IP-in-IP or GRE encapsulations do not provide bandwidth guarantees, is loosely routed (which may result in undesirable/unexpected data flow), and may hide a flow identifier that transit routers may use to perform Equal Cost Multi-path (ECMP) hashing.

Alternatively, network devices may use MPLS for traffic engineering using constraints. In these examples, network devices use Resource Reservation Protocol with Traffic Engineering extensions (RSVP-TE) or Source Packet Routing in Networking with traffic extensions (SR-TE) to steer traffic based on constraint information. However, such MPLS-specific traffic engineering mechanisms require hardware and data plane support. For example, to implement Segment Routing over an IPv6 data plane (SRv6), network devices must have hardware that can support the number of Segment identifiers (SIDs) encoded in a segment routing header (SRH). Similarly, to implement Segment Routing over an IPv6+(SRv6+), network devices must have hardware that can support the extensions to the control plane and data plane (e.g., mapping of short SIDs to 128-bit SID/v6 addresses). The MPLS traffic engineering mechanisms described above are limited only to IPv6, supports strict and loose routing, requires extensions to existing control plane to advertise topological and service SIDs, may require a steep learning curve for operators (e.g., for the variations of transport SIDs, service SIDs, etc.), and may be limited to centralized bandwidth management for implementing constraint based paths.

In accordance with the techniques described herein, routers 12 may signal explicit IP path tunnels for traffic engineering using constraints within an IP network using, for example, a resource reservation protocol, such as RSVP, to signal explicit IP path tunnels used to steer traffic along the IP path based on path constraints, such as bandwidth, low-latency path, service disjointness, SRLG aware paths, or the like, without having to introduce MPLS into network 14.

In one example implementation, ingress router 12A may compute an IP path, e.g., IP path 16, using constraints and may signal control plane reservations using RSVP to establish IP path 16. IP path 16 may represent either an IPv4 tunnel or IPv6 tunnel. When implementing RSVP, for example, ingress router 12A may send a path signaling message, e.g., RSVP PATH message 22, that may include path identification information for IP path 16. The path identification information may represent identification for a forwarding equivalence class (FEC) for IP path 16. For example, the path identification information of RSVP PATH message 22 may include an Explicit Route Object (ERO) that specifies next hop attributes for IP path 16 between the ingress router 12A and the egress router 12D. The ERO may include a list of transit routers, e.g., routers 12B, 12C, and the egress router 12D along the explicit route such as IP path 16. The path identification information of RSVP PATH message 22 may also include a Traffic Specification (TSPEC) object that specifies traffic characteristics of the data flow (e.g., bandwidth requirements or other constraints). In some examples, the path identification information of RSVP PATH message 22 may include a Sender Template object that is used by ingress router 12A of the RSVP PATH message 22 to uniquely identify ingress router 12A as the traffic source for IP path 16. For example, the Sender Template object may include a path identifier for IP path 16, the IP address of the sender node, and, in some examples, the sender's port number.

Although the techniques described herein is described with respect to an ingress router establishing an IP path, a centralized controller may alternatively, or additionally, perform one or more aspects of the techniques described in this disclosure. For example, the centralized controller may have visibility over the topology of network 14 and compute a constrained path by signaling control plane reservations to routers 12 to establish IP path 16.

Transit routers 12B, 12C each receives the RSVP PATH message 22 including path identification information such as an ERO and forwards the RSVP PATH message 22 toward the destination along a path specified by the ERO. The transit routers 12B, 12C may each compare the bandwidth requested with the bandwidth available on an outgoing link of the transit router, and forwards the RSVP PATH message 22 downstream if the transit router has enough resources for IP path 16.

When egress router 12D receives the RSVP PATH message 22, egress router 12D may generate a path reservation signaling message, e.g., RSVP RESV message 24, for IP path 16 and send the RSVP RESV message 24 back upstream towards ingress router 12A following the path state created by the ERO of the RSVP PATH message 22 in reverse order. In some examples, egress router 12D may allocate a set of IP addresses (referred to herein as "egress address block (EAB)"), such as an IP prefix, to enable egress router 12D to receive traffic that is encapsulated with any IP address selected from the EAB. That is, rather than allocating a label that is used to steer traffic in MPLS toward the egress router 12D, egress router 12D may allocate an EAB by which the egress router 12D may receive traffic encapsulated with any IP address selected from the EAB. In the illustrated example of FIG. 1, egress router 12D may allocate an egress address block of 192.168.4.0/24.

Egress router 12D may send the RSVP RESV message 24 with an IP address selected from the EAB (referred to herein as "egress IP address") in the reverse order of IP path 16. That is, the egress IP address is not advertised using IGP, for example, and is managed by RSVP. In the example of FIG. 1, egress router 12D may send the RSVP RESV message 24 including an egress IP address of 192.168.4.1/32 selected from the EAB of 192.168.4.0/24. RSVP RESV message 24 may include path identification information for IP path 16. For example, the path identification information of RSVP RESV message 24 may include a Filter Specification (FSPEC) object that includes an identifier of the traffic source (e.g., ingress router 12A) and an identifier for IP path 16. In some examples, the egress IP address is specified in an LSP attributes object type-length-value (TLV) of an RSVP RESV message as described A. Farrel, Ed., et al., "Encoding of Attributes for MPLS LSP Establishment Using Resource Reservation Protocol Traffic Engineering (RSVP-TE)," Network Working Group, RFC 5420, February 2009, the entire contents of which is incorporated by reference herein.

Egress router 12D may also generate forwarding information that de-encapsulates a packet header with the egress IP address (e.g., 192.168.4.1/32) and to forward the packet through an outgoing interface to a destination, e.g., customer network 6B.

When transit router 12C receives the RSVP RESV message 24, transit router 12C may store a route to the egress IP address within its routing information. For example, transit router 12C may extract the egress IP address specified in the RSVP RESV message 24 and program in its routing information a path to the egress IP address and with the next hop extracted from the ERO that was included in the RSVP PATH message 22. Using the routing information, the transit router 12C may generate forwarding information that associates the egress IP address (e.g., egress IP address of 192.168.4.1/32) with a specific next hop and corresponding outgoing interface. In the example of FIG. 1, transit router 12C may determine, based on the ERO that was included in the RSVP PATH message 22, the next hop for the route is to egress router 12D. Transit router 12C may configure its forwarding information to forward traffic encapsulated with the egress IP address through an outgoing interface to egress router 12D. Transit router 12C may reserve resources, such as bandwidth, for an outgoing link (e.g., link 18C), and sends the RSVP RESV message 24 upstream to transit router 12B.

When transit router 12B receives the RSVP RESV message 24, transit router 12B may store a route to the egress IP address within its routing information. For example, transit router 12B may extract the egress IP address specified in the RSVP RESV message 24 and program in its routing information a path to the egress IP address and with the next hop extracted from the ERO that was included in the RSVP PATH message 22. Using the routing information, the transit router 12B may generate forwarding information that associates the egress IP address (e.g., egress IP address of 192.168.4.1/32) with a specific next hop and corresponding outgoing interface. In the example of FIG. 1, transit router 12B may determine, based on the ERO that was included in the RSVP PATH message 22, the next hop for the route is to transit router 12C. Transit router 12B may configure its forwarding information to forward traffic encapsulated with the egress IP address through an outgoing interface to transit router 12C. Transit router 12B may reserve bandwidth for an outgoing link (e.g., link 18B), and sends the RSVP RESV message 24 upstream to ingress router 12A.

In response to receiving the RSVP RESV message 24, ingress router 12A may store a route to the egress IP address within its routing information. For example, transit router 12B may extract the egress IP address specified in the RSVP RESV message 24 and program in its routing information a path to the egress IP address and with the next hop extracted from the ERO that was included in the RSVP PATH message 22. Using the routing information, the ingress router 12A may generate forwarding information that associates the egress IP address (e.g., egress IP address of 192.168.4.1/32) with a specific next hop and corresponding outgoing interface. In the example of FIG. 1, ingress router 12A may determine, based on the ERO that was included in the RSVP PATH message 22, the next hop for the route is to transit router 12B. Ingress router 12A may configure its forwarding information to encapsulate the egress IP address as a header to a data packet to steer the packet on the constrained path to the egress IP address. Ingress router 12A may reserve bandwidth for an outgoing link (e.g., link 18A), and effectively establishes the IP path 16.

When the ingress router 12A receives a data packet, e.g., packet 26, from customer network 6A and destined for customer network 6B, the ingress router 12A may inject packet 26 into the IP network 14 with the egress IP address (e.g., 192.168.4.1/32) as a packet header 28 to packet 26, to steer packet 26 along IP path 16. For example, when ingress router 12A receives packet 26, ingress router 12A may perform a lookup of its forwarding information and determines the specific outgoing interface to a next hop for which to send the packet (e.g., the outgoing interface to transit router 12B). Based on the lookup, ingress router 12A may perform IP-in-IP encapsulation where the packet is encapsulated with the egress IP address as an IP transport header. Ingress router 12A encapsulates packet 26 with the egress IP address as a packet header 28 and sends the encapsulated packet to its next hop, e.g., router 12B.

When transit router 12B receives packet 26 encapsulated with packet header 28, transit router 12B performs a lookup of its forwarding information based on the egress IP address specified in packet header 28 and determines the outgoing interface used to forward the packet to the next hop, e.g., transit router 12C. Similarly, when transit router 12C receives the packet 26 encapsulated with packet header 28, transit router 12C performs a lookup of its forwarding information based on the egress IP address specified in packet header 28 and determines the outgoing interface used to forward the packet to the next hop, e.g., egress router 12D.

When egress router 12D receives the packet 26 encapsulated with packet header 28, the egress router 12D may de-encapsulate the packet header 28 from the packet 26 and forward the packet 26 toward customer network 6B (e.g., using the destination address specified in the packet).

In some examples, ingress router 12A may additionally, or alternatively, send path identification information of RSVP PATH message 22 including a flow filter (e.g., flow label) associated with IP path 16 that causes routers on IP path 16 to steer packets encapsulated with the flow label along IP path 16. A flow label may provide a unique identification for a specific packet flow. For example, a transit router of an IP path 16 may use the flow label to perform Equal Cost Multi-Path (ECMP) hashing to steer the packet on IP path 16. Additional examples of a flow label are described in S. Amante, et al., "IPv6 Flow Label Specification," Internet Engineering Task Force (IETF), Request for Comments (RFC) 6437, November 2011, and T. Dreibholz, "An IPv4 Flowlabel Option," Network Working Group, draft-dreibholz-ipv4-flowlabel-29, Mar. 6, 2019, the entire contents of both of which are incorporated by reference herein.

In the illustrated example of FIG. 1, ingress router 12A may allocate a flow label associated with IP path 16. Ingress router 12A may further include the flow label in the path identification information of RSVP PATH message 22 to cause transit routers, e.g., transit routers 12B, 12C, to steer packets encapsulated with the flow label along IP path 16. In these examples, routers 12 may differentiate packet flows using a flow label rather than using different egress addresses from an egress address block.

To configure IP path 16, ingress router 12A may send the RSVP PATH message 22 that may include path identification information for IP path 16 that further includes a flow label. As described above, the path identification information of RSVP PATH message 22 may include an ERO that specifies next hop attributes (e.g., next hops) for IP path 16 between the ingress router 12A and the egress router 12D. The path identification information of RSVP PATH message 22 may also include a Traffic Specification (TSPEC) object that specifies traffic characteristics of the data flow (e.g., bandwidth requirements or other constraints). The path identification information may further include a flow label associated with IP path 16 to cause transit routers, e.g., transit routers 12B, 12C, to steer traffic having the flow label on IP path 16.

Each of transit routers 12B, 12C receives the RSVP PATH message 22 including the flow label. As further described below, each of transit routers 12B, 12C may use the flow label to configure a classifier in its forwarding information to steer a packet that matches a classifier on IP path 16. Each of transit routers 12B, 12C forwards the RSVP PATH message 22 toward the destination along a path specified by the ERO.

When egress router 12D receives the RSVP PATH message 22, egress router 12D may generate forwarding information to de-encapsulate the flow label from a packet and to forward the packet through an outgoing interface to the destination, e.g., customer network 6B, using the original destination address of the packet. Egress router may generate an RSVP RESV message 24 for IP path 16 and send the RSVP RESV message 24 back upstream towards ingress router 12A following the path state created by the RSVP PATH message 22 in reverse order. Egress router 12D may send the RSVP RESV message 24 including an IP address of egress router 12D. As described above, the egress IP address may be specified in an LSP attributes object TLV of an RSVP RESV message.

When transit router 12C receives the RSVP RESV message 24, transit router 12C may store a route to the egress IP address within its routing information. For example, transit router 12C may extract the egress IP address specified in the RSVP RESV message 24 and program in its routing information a path to the egress IP address and with the next hop extracted from the ERO that was included in the RSVP PATH message 22. Transit router 12C may configure its routing information with a flow specification (flow spec) filter, such as a 3-tuple comprising the source address of ingress router 12A, the destination address of egress router 12D, and flow label of IP path 16 (e.g., <source address, destination address, flow label>). Using the routing information, the transit router 12C may generate forwarding information that associates the egress IP address with a specific next hop and corresponding outgoing interface. In the example of FIG. 1, transit router 12C may determine, based on the ERO that was included in the RSVP PATH message 22, the next hop for the route is to egress router 12D. Transit router 12C may use the flow specification filter of its routing information to configure its forwarding information with a classifier to steer traffic that matches the 3-tuple in its routing information on IP path 16 through an outgoing interface to egress router 12D. Transit router 12C may reserve resources, such as bandwidth, for an outgoing link (e.g., link 18C), and sends the RSVP RESV message 24 upstream to transit router 12B.

When transit router 12B receives the RSVP RESV message 24, transit router 12B may store a route to the egress IP address within its routing information. For example, transit router 12B may extract the egress IP address specified in the RSVP RESV message 24 and program in its routing information a path to the egress IP address and with the next hop extracted from the ERO that was included in the RSVP PATH message 22. Transit router 12B may configure its routing information with a flow specification filter (e.g., <source address of ingress router 12A, destination address of egress router 12D, and flow label of IP path 16). Using the routing information, the transit router 12B may generate forwarding information that associates the egress IP address with a specific next hop and corresponding outgoing interface. In the example of FIG. 1, transit router 12B may determine, based on the ERO that was included in the RSVP PATH message 22, the next hop for the route is to transit router 12C. Transit router 12B may use the flow specification filter of its routing information to configure its forwarding information with a classifier to steer traffic that matches the 3-tuple in its routing information on IP path 16 through an outgoing interface to transit router 12C. Transit router 12B may reserve resources, such as bandwidth, for an outgoing link (e.g., link 18B), and sends the RSVP RESV message 24 upstream to ingress router 12A.

In response to receiving the RSVP RESV message 24, ingress router 12A may store a route to the egress IP address within its routing information. For example, ingress router 12A may extract the egress IP address specified in the RSVP RESV message 24 and program in its routing information a path to the egress IP address and with the next hop extracted from the ERO that was included in the RSVP PATH message 22. Using the routing information, the ingress router 12A may generate forwarding information that associates the egress IP address with a specific next hop and corresponding outgoing interface. In the example of FIG. 1, the ingress router 12A may determine, based on the ERO that was included in the RSVP PATH message 22, the next hop for the route is to transit router 12B. Ingress router 12A may also configure its forwarding information to encapsulate a destination address of egress router 12D and the flow label for IP path 16, and to forward the encapsulated packet through an outgoing interface to a next hop, e.g., transit router 12B.

When the ingress router 12A receives a data packet, e.g., packet 26, from customer network 6A and destined for customer network 6B, the ingress router 12A may inject packet 26 into the IP network 14 with a packet header comprising the destination address of egress router 12D and the flow label for IP path 16. For example, when ingress router 12A receives packet 26, ingress router 12A may perform a lookup of its forwarding information and determines the specific outgoing interface to a next hop for which to send the packet (e.g., the outgoing interface to transit router 12B). Based on the lookup, ingress router 12A may encapsulate packet 26 with the egress IP address and the flow label for IP path 16 as an IP transport packet header, and sends the encapsulated packet to its next hop, e.g., router 12B.

When transit router 12B receives the packet encapsulated with the egress IP address and the flow label for IP path 16, transit router 12B may perform a lookup of its routing information and determines the packet header matches the flow specification filter in the routing information. Transit router 12B then performs a lookup of its forwarding information to determine the outgoing interface used to forward the packet to the next hop, e.g., transit router 12C, of IP path 16. Similarly, when transit router 12C receives the packet encapsulated with the egress IP address and the flow label for IP path 16, transit router 12C may perform a lookup of its routing information and determines the packet header matches the flow specification filter in the routing information. Transit router 12C then performs a lookup of its forwarding information to determine the outgoing interface used to forward the packet to the next hop, e.g., egress router 12D, on IP path 16. When egress router 12D receives the packet, the egress router 12D may de-encapsulate the egress IP address and the flow label for IP path 16 from the packet and forwards the packet toward through an outgoing interface to the destination, e.g., customer network 6B, using the original destination address of the packet.

The techniques described herein may provide one or more technical advantages that provide a practical application. For example, by explicitly signaling IP path tunnels using a resource reservation protocol such as RSVP, routers of an IP network may perform traffic engineering using constraints without using MPLS protocols, such as RSVP-TE and SR-TE, that require new hardware or data plane support to provide traffic engineering. Moreover, the techniques described herein natively support IP forwarding for both IPv4 and IPv6, and therefore avoid the use of traffic engineering mechanisms that support only IPv4 or only IPv6. By performing one or more aspects of the techniques described herein, routers of an IP network may also avoid using IP-in-IP or GRE tunneling mechanisms that have limitations to the number of encapsulations and do not provide bandwidth guarantees. Additionally, make-before-break procedures with RSVP (e.g., for IP path replacement or bandwidth resizing) can be implemented with little to no changes.

Figure 2:
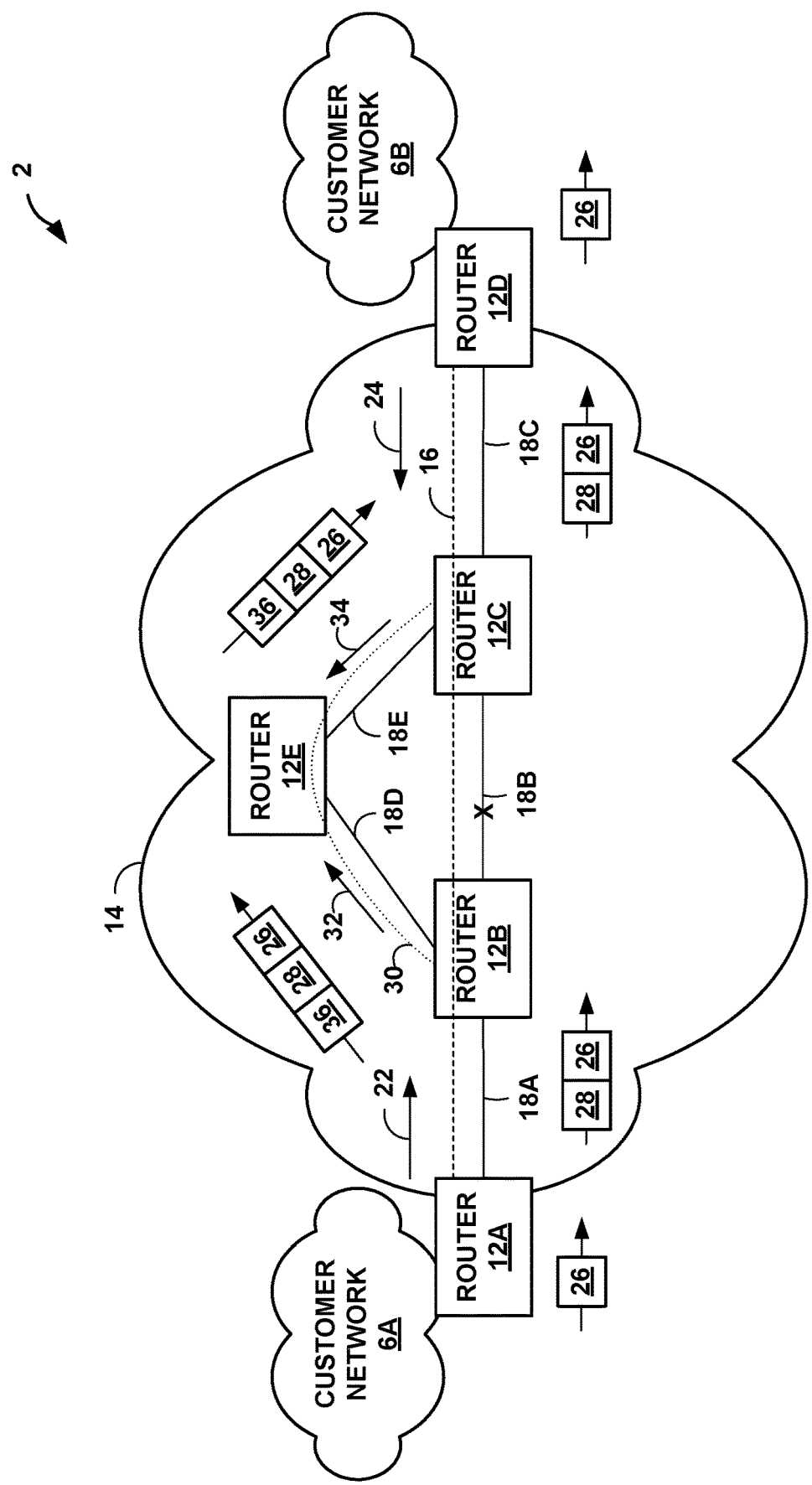
FIG. 2 is a block diagram illustrating another example network system in which network devices configure a bypass path to protect an IP path, in accordance with one or more aspects of the techniques described in this disclosure.

FIG. 2 is a block diagram illustrating another example network system in which network devices configure a bypass path to protect an IP path, in accordance with techniques described in this disclosure. Network 14 of FIG. 2 is similar to network 14 of FIG. 1, except as described below.

As described above, routers 12 may establish IP path 16. In some examples, routers 12 may also configure a bypass path to protect IP path 16. In the illustrated example of FIG.

2, routers 12B, 12E, and 12C may establish a bypass path 30 to protect IP path 16 in the event link 18B fails. For example, in addition to sending RSVP PATH message 22 to establish IP path 16, router 12B may send an RSVP PATH message 32 to establish bypass path 30. In this example, router 12B may send RSVP PATH message 32 including path identification information for the bypass path 30. For example, path identification information of RSVP PATH message 32 may include an ERO that specifies the bypass path 30 between the point of local repair router, e.g., router 12B, and a router that merges bypass path 30 and IP path 16 (referred to herein as "merge point router"), e.g., router 12C. The ERO for the bypass path 30 may specify a path along link 18D that connects router 12B and router 12E, and link 18E that connects router 12E and router 12C.

When the merge point router 12C receives RSVP PATH message 32, merge point router 12C may generate an RSVP RESV message 34 for bypass path 30 and send the RSVP RESV message 34 back upstream towards the point of local repair router 12B following the path state created by the RSVP PATH message 32 in reverse order. Merge point router 12C may allocate a set of IP addresses (i.e., egress address block) to enable merge point router 12C to receive traffic encapsulated with an IP address from the egress address block. For example, merge point router 12C may allocate an egress address block of 192.168.3.0/24, by which router 12C may receive traffic encapsulated with an IP address from the egress address block, e.g., 192.168.3.0/24.

Merge point router 12C may send the RSVP RESV message 34 with the IP address from an address block allocated by merge point router 12C (referred to herein as "merge point IP address") in the reverse order of bypass path 30 based on the ERO included in RSVP PATH message 32. That is, merge point router 12C may operate as an egress router for the bypass path and the merge point IP address would be an egress address block for the bypass path.

When router 12E receives the RSVP RESV message 34, router 12E may store the merge point IP address as a bypass route within its routing information. Using the routing information, the router 12E may generate forwarding information that associates the destination of the bypass path 30 (e.g., merge point IP address of 192.168.3.0/24) with a specific next hop and corresponding outgoing interface. Router 12E may determine, based on the ERO that was included in the RSVP PATH message 32, the next hop for the bypass route is to router 12C. In the example of FIG. 2, router 12E may configure its forwarding information to forward traffic encapsulated with the merge point IP address through an outgoing interface to merge point router 12C. Router 12E then sends the RSVP RESV message 34 upstream to the point of local repair router 12B.

When the point of local repair router 12B receives the RSVP RESV message 34, router 12B may store a bypass route to the merge point IP address within its routing information. In the example of FIG. 2, router 12B may pre-configure the bypass path 30 conditioned on a failure event, referred to as make-before-break (MBB). For example, the point of local repair router 12B may use the routing information to generate forwarding information that associates the destination of the bypass path 30 (e.g., merge point IP address) with a specific next hop and corresponding outgoing interface. In the event the point of local repair router 12B detects (or learns) that link 18B has failed, the point of local repair router 12B may forward traffic on bypass path 30. Routers 12 may identify link failures using, for example, protocols such as bidirectional forwarding detection (BFD), link-layer operations, administration, and management (OAM) protocol, link-state protocols (e.g., IS-IS or OSPF). When the point of local repair router 12B detects that link 18B has failed, router 12B may forward traffic encapsulated with the merge point IP address through an outgoing interface to transit router 12E. Router 12B may determine, based on the ERO that was included in the RSVP PATH message 32, the next hop for the bypass route is to router 12E.

When the ingress router 12A receives a packet, e.g., packet 26, from customer network 6A and destined for customer network 6B, the ingress router 12A may inject packet 26 into the IP network 14 with the egress IP address (e.g., 192.168.4.1/32) as a packet header 28 to packet 26, to steer packet 26 along IP path 16. When transit router 12B receives packet 26, transit router 12B performs a lookup of its forwarding information based on the egress IP address specified in the packet header 28 and determines the packet is to be forwarded along the bypass path 30. Transit router 12B encapsulates a merge point IP address (e.g., 192.168.4.0/24) as a packet header 36 to packet 26 and sends the packet through the outgoing interface to router 12E. When router 12E receives the packet 26, router 12E performs a lookup of its forwarding information based on the merge point IP address specified in the packet header 36 and sends packet 26 toward router 12C via the outgoing interface. When the merge point router 12C receives packet 26, router 12C de-encapsulates the packet header 36 from packet 26 and performs a lookup of its forwarding information based on the egress IP address specified in packet header 28 (which is now the IP header). Router 12C determines based on the lookup the outgoing interface used to forward packet 26 to egress router 12D and sends packet 26 toward the egress router 12D via the outgoing interface. When egress router 12D receives the packet 26, the egress router 12D may de-encapsulate the packet header 28 from the packet 26 and forwards the packet 26 toward customer network 6B.

Although the example described in FIG. 2 is described with respect to a transit router configuring a bypass path, the ingress router (acting as a point of local repair) may configure a bypass path in accordance with one or more aspects of the techniques described in this disclosure.

In this way, by configuring a bypass path in accordance with one or more aspects of the techniques described herein, routers may provide re-routing procedures (e.g., fast re-route) with little to no changes and without the need for loop-free alternate routing.

Figure 3:
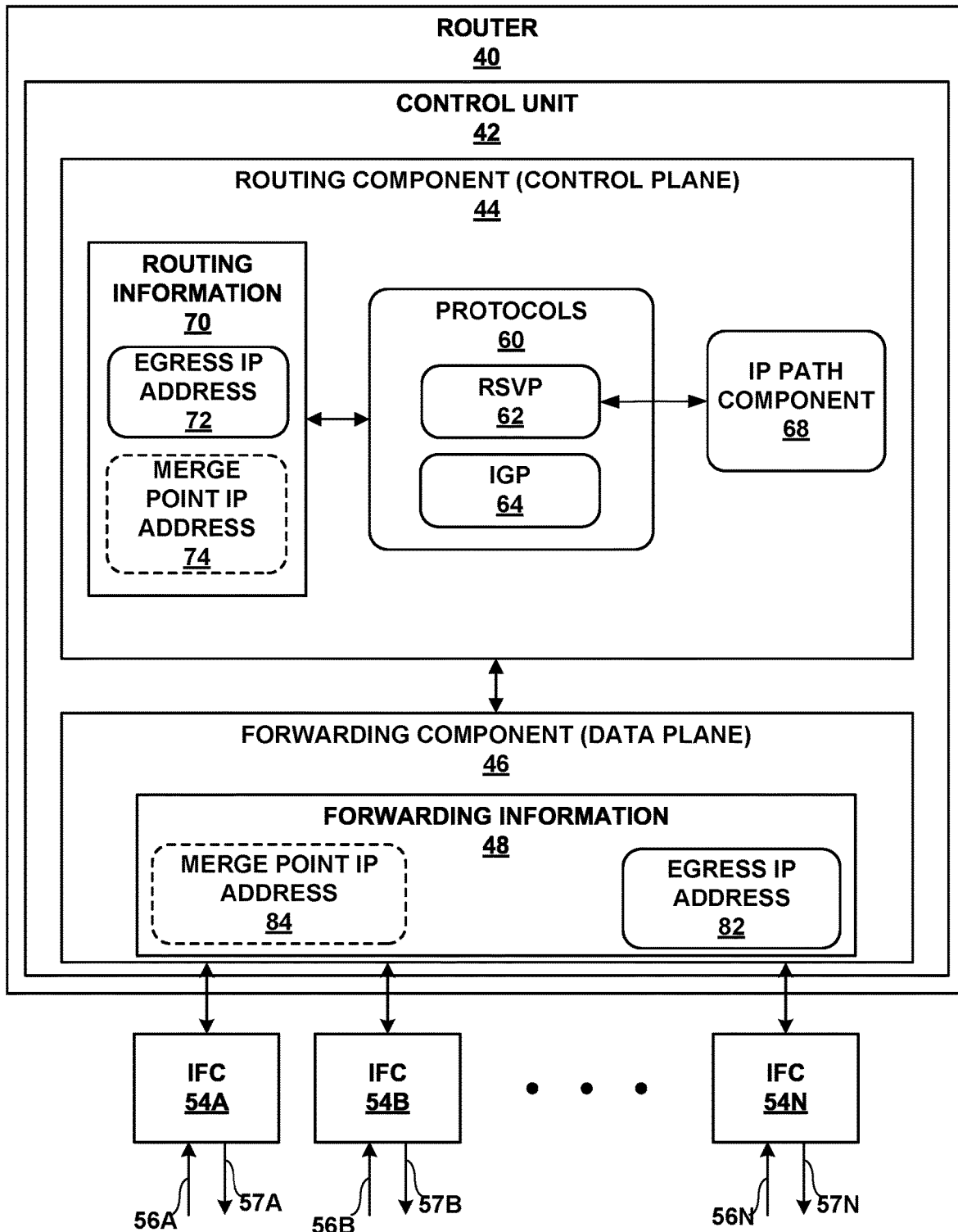
FIG. 3 is a block diagram illustrating a router performing various aspects of the techniques described in this disclosure.

FIG. 3 is a block diagram illustrating an example router 40 that performs various aspects of the techniques described in this disclosure. Router 40 may represent any of routers 12 of FIGS. 1-2. While FIG. 3 is described with respect to a router, the techniques may be implemented by any other type of network device capable of implementing at least routing protocols including a resource reservation protocol, such as RSVP, and IP forwarding. Thus, while described with respect to router 40, the techniques should not be limited to router 40 described with respect to the example of FIG. 3.

In the example of FIG. 3, router 40 includes interface cards 54A-54N ("IFCs 54") that receive and send data units, such as packet flows, via network links 56A-56N and 57A-57N, respectively. Router 40 may include a chassis (not shown) having a number of slots for receiving a set of cards, including IFCs 54. Each card may be inserted into a corresponding slot of the chassis for electrically coupling the card to routing component 44 via high-speed switch (not shown), which may comprise, for example, switch fabric, switch-gear, a configurable network switch or hub, or other high-speed switching mechanisms. IFCs 54 may be coupled to network links 56A-56N and 57A-57N via a number of physical interface ports (not shown). Generally, IFCs 54 may each represent one or more network interfaces by which router 40 may interface with links of a network, such as links 18 as shown in the examples of FIGS. 1 and 2.

In general, router 40 may include a control unit 42 that determines routes of received packets and forwards the packets accordingly via IFCs 54. In the example of FIG. 3, control unit 42 includes routing component 44 (control plane) that configures and controls packet forwarding operations applied by packet forwarding component 46 (data plane).

Routing component 44 may include routing information 70. Routing information 70 may describe the topology of the network in which router 40 resides, and may also describe various routes within the network and the appropriate next hops for each route, i.e., the neighboring routing devices along each of the routes. Routing component 44 analyzes the information stored in routing information 70 to generate forwarding information, e.g., forwarding information 48. Routing component 44 then installs forwarding data structures into forwarding information 48 within forwarding component 46. Forwarding information 48 associates network destinations with specific next hops and corresponding interface ports within the forwarding plane. Routing component 44 selects specific paths through the IP network and installs the next hop along those specific paths in forwarding information 48 within forwarding component 46.

Routing component 44 provides an operating environment for various routing protocols 60 that execute at different layers of a network stack. Routing component 44 is responsible for the maintenance of routing information 70 to reflect the current topology of a network and other network entities to which router 40 is connected. In particular, routing protocols periodically update routing information 70 to accurately reflect the topology of the network and other entities based on routing protocol messages received by router 40. The protocols may be software processes executing on one or more processors. For example, routing component 44 includes network protocols that operate at a network layer of the network stack, which are typically implemented as executable software instructions.

In accordance with the techniques described in this disclosure, router 40 may extend RSVP 62 to signal explicit IP path tunnels to establish IP paths (e.g., IP path 16 of FIG. 1 or bypass path 30 of FIG. 2) based on path constraints, such as bandwidth, low-latency path, service disjointness, Shared Risk Link Group (SRLG) aware paths, or the like.

For an example in which router 40 is operating as an ingress router of an IP network (e.g., router 12A of FIG. 1), IP path component 68 of router 40 may extend RSVP 62 to send an RSVP PATH message including path identification information associated with an IP path. For example, IP path component 68 may send path identification information of an RSVP PATH message including an ERO that specifies next hop attributes of an IP path and traffic characteristics of the data flow (e.g., via a TSPEC object). As further described in FIG. 4, IP path component 68 may extend RSVP 62 to generate an extended RSVP PATH message to include a sender template object that carries the identification of the forwarding equivalence class of the IP path. Additionally, or alternatively, IP path component 68 may in some examples extend RSVP 62 to include a flow label within an RSVP PATH message. The flow label may be allocated by router 40 and is inserted in packets forwarded over the IP path to cause routers on the IP path to forward the packet that matches the flow label along the IP path towards the egress router.

IP path component 68 of router 40 may also cause router 40 to store a route to an egress IP address included in an RSVP RESV message. For example, router 40 may receive the RSVP RESV message including an IP address selected from an egress address block that is allocated by egress router 12D (illustrated as egress IP address 72). In some examples in which a flow label is used to steer traffic on the IP path, router 40 may receive the RSVP RESV message including the IP address of the egress router. IP path component 68 may cause router 40 to store a route to reach the egress IP address in routing information 70. IP path component 68 may also determine a next hop for the IP path. For example, IP path component 68 may determine, based on an ERO included in an RSVP PATH message, a next hop for the IP path.

Routing component 44 analyzes the route to reach egress IP address 72 that is stored in routing information 70 to generate forwarding information 48 within forwarding component 46. Forwarding information 48 associates the egress IP address of the IP path (e.g., the egress IP address 70) with specific next hop and corresponding interface port within the forwarding plane. For example, routing component 44 may configure a next hop in forwarding information 48 that causes router 40 to forward traffic destined for the egress IP address through one of IFCs 54 connected to the next hop of the IP path. In the example where router 40 represents an ingress router, routing component 44 may further use the route to reach egress IP address 72 that is stored in routing information 70 to configure forwarding information 48 that includes an outgoing interface and next hop used to steer the packet along the IP path toward the egress IP address. Routing component 44 may configure forwarding information 48 to encapsulate the egress IP address as a packet header to a packet before forwarding the packet to the next hop. Additionally, or alternatively, routing component 44 may allocate a flow label associated with an IP path and configure forwarding information 48 to encapsulate the flow label to an outgoing packet.

In an example in which router 40 is operating as an egress router of the IP network (e.g., router 12D of FIG. 1), IP path component 68 may cause router 40 to generate an RSVP RESV message including an IP address of router 40. For example, when operating as an egress router, router 40 may allocate an egress address block, such as an IP prefix, by which router 40 may receive traffic encapsulated with any IP address from the egress address block. In response to receiving the RSVP PATH message from an upstream router of the IP path, router 40 may send an RSVP RESV message in the reverse order of the IP path specified by the ERO included in the RSVP PATH message. Router 40 may extend RSVP 62 to generate an RSVP RESV message including an egress IP address from the egress address block. For example, router 40 may select an IP address from the egress address block and assign the selected IP address to one or more IP paths. In these examples, router 40 may maintain a table that associates particular IP addresses of the egress address block to corresponding paths. As further described in FIG. 5, IP path component 68 may extend RSVP 62 to generate an RSVP RESV message to include a filter specification object that carries the identification of the forwarding equivalence class of the IP path.

In some examples, router 40 (operating as an egress router) may receive an RSVP PATH message including a flow label, and in response, may generate an RSVP RESV message including the IP address of router 40. In the example where router 40 represents an egress router, routing component 44 may further use egress IP address 72 in routing information 70 to configure forwarding information 48 to de-encapsulate a packet header encapsulated with egress IP address 82 and the flow label, and to forward the packet to the destination.

In an example in which router 40 is operating as a transit router of the IP network (e.g., routers 12B, 12C of FIG. 1), IP path component 68 may cause router 40 to receive the RSVP PATH message including an ERO and determine whether the router 40 has enough resources for the requested constraints. For example, IP path component 68 may compare the bandwidth requested for the IP path with the bandwidth available on outgoing links 57 before forwarding the RSVP PATH message downstream. IP path component 68 may also cause router 40 to store a route to the egress IP address included in the RSVP RESV message. For example, IP path component 68 may extract an egress IP address of egress router 12D included in the RSVP RESV message and store a route to the egress IP address 72 in routing information 70. IP path component 68 may also determine a next hop for the IP path based on the ERO included in an RSVP PATH message.

In some examples in which a flow label is used to steer traffic on the IP path, router 40 (operating as a transit router) may exchange RSVP messages including a flow label, and in response, may configure routing information 70 with a flow specification filter, such as a 3-tuple comprising the source address of the ingress router, the destination address of the egress router, and the flow label of the IP path.

Routing component 44 analyzes the egress IP address 72 in routing information 70 to generate forwarding information 48 within forwarding component 46. Forwarding information 48 associates the IP address of the egress router of the IP path (e.g., the egress IP address 72) with specific next hop and corresponding interface port within the forwarding plane. For example, routing component 44 may configure a next hop in forwarding information 48 that causes router 40 to forward traffic encapsulated with an egress IP address (and/or in some instances where the traffic is additionally encapsulated with a flow label) through one of IFCs 54 connected to the next hop of the IP path.

In some examples, IP path component 68 may cause router 40 to establish a bypass path (e.g., bypass path 30 of FIG. 2) to protect an IP path in the event a link of the IP path fails. Assume for example router 40 represents a point of local repair for the bypass path (e.g., router 12B of FIG. 2) and outgoing link 57A represents link 18B. In this example, IP path component 68 may configure a bypass path in the event outgoing link 57A fails. To establish a bypass path, IP path component 68 may extend RSVP 62 to send an RSVP PATH message including an ERO that specifies the bypass path between the point of local repair, e.g., router 40, and a merge point (e.g., router 12C of FIG. 2). The ERO for the bypass path may specify a path along outgoing link 57B (e.g., link 15D of FIG. 2), that connects to a next hop router along the bypass path. IP path component 68 may also cause router 40 to store a merge point IP address included in the RSVP RESV message for the bypass path. For example, router 40 may receive the RSVP RESV message including a merge point IP address of router 12C. IP path component 68 may cause router 40 to store the merge point IP address 74 in routing information 70.

In the event router 40 detects, for example, a failure to outgoing link 57A, routing component 44 may use merge point IP address 74 in routing information 70 to generate forwarding information 48 that associates the merge point IP address 74 of the bypass path with specific next hop and corresponding interface port within the forwarding plane. For example, protocols 60 of router 40 may include failure detection protocols such as BFD, OAM, or link-state protocols (e.g., IS-IS or OSPF) to identify link failures. In response to detecting a link failure to outgoing link 57A, routing component 44 may configure a next hop in forwarding information 48 that causes router 40 to forward traffic encapsulated with an egress IP address (and/or in some instances a flow label) through one of IFCs 54 connected to the next hop of the bypass path. In the example where router 40 represents the point of local repair router, routing component 44 may further use merge point IP address 74 in routing information 70 to configure forwarding information 48 to encapsulate a packet with merge point IP address 84 as a packet header to steer the packet along the bypass path toward merge point router.

In this way, when router 40 receives a packet along the IP path that is encapsulated with an egress IP address, forwarding component 46 may perform a lookup of forwarding information 48 and determine that the next-hop is to router 12E through outgoing interface 54B. Forwarding component 46 may encapsulate the packet with the merge point IP address 84 as a packet header to steer the packet along the bypass path.

Assume for example router 40 represents a merge point for the bypass path (e.g., router 12C of FIG. 2) and incoming link 57A represents link 18B. In this example, when router 40 receives the RSVP PATH message for the bypass path, IP path component 68 may extend RSVP 62 to send an RSVP RESV message including a merge point IP address of router 40 back upstream towards the point of local repair router (e.g., router 12B of FIG. 2) following the path state created by the RSVP PATH message for the bypass path in reverse order. Routing component 44 may further use merge point IP address 74 in routing information 70 to configure forwarding information 48 to de-encapsulate a packet header with merge point IP 84, perform a lookup of forwarding information 48 based on the current packet header (e.g., egress IP address 82), and forward the packet along the IP path toward the egress router via one of outgoing interfaces 54.

Although described for purposes of example with respect to a router, router 40 may be more generally a network device having routing functionality, and need not necessarily be a dedicated routing device. The architecture of router 40 illustrated in FIG. 3 is shown for example purposes only. The techniques of this disclosure are not limited to this architecture. In other examples, router 40 may be configured in a variety of ways. In one example, some of the functionally of control unit 42 may be distributed within IFCs 54. In another example, control unit 42 may comprise a plurality of packet forwarding engines operated as slave routers.

Control unit 42 may be implemented solely in software, or hardware, or may be implemented as a combination of software, hardware, or firmware. For example, control unit 42 may include one or more processors that execute program code in the form of software instructions. In that case, the various software components/modules of control unit 42 may comprise executable instructions stored on a computer-readable storage medium, such as computer memory or hard disk.

Figure 4:
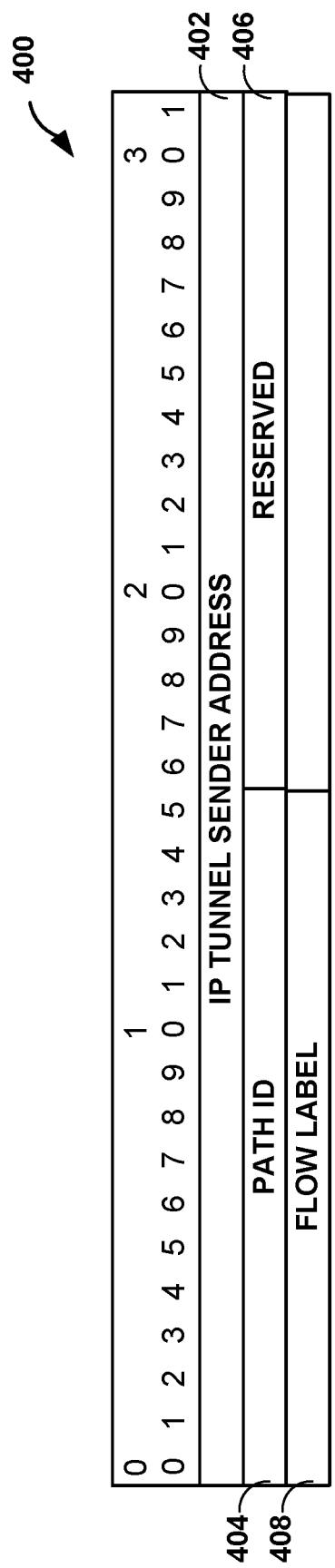
FIG. 4 is a block diagram illustrating a conceptual diagram illustrating an example format of an IP object used for signaling IP path tunnels for traffic engineering using constraints in an IP network, in accordance with one or more aspects of the techniques described in this disclosure.

FIG. 4 is a block diagram illustrating a conceptual diagram illustrating an example format of an IP object used for signaling IP path tunnels for traffic engineering using constraints in an IP network, in accordance with one or more aspects of the techniques described in this disclosure. IP object 400 may represent a modified sender template object of an RSVP PATH message or a modified filter specification object of an RSVP RESV message. Additional examples of the sender template object and filter specification object are described in D. Awduche, et al., "RSVP-TE: Extensions to RSVP for LSP Tunnels," Request for Comments 3209, December 2001, the entire contents of which is incorporated by reference herein.

In the illustrated example of FIG. 4, IP object 400 may include an IP Tunnel Sender Address field 402, a path identifier field 404 ("PATH ID 404"), and a reserved field 406. In some examples, IP object 400 may alternatively, or additionally, include flow label field 408.

In the example of FIG. 4, the IP Tunnel Sender Address field 402 may specify an IPv4 (32-bit) or IPv6 address (128-bit) of a sender node. For example, IP Tunnel Sender Address 402 may include an IP address for ingress router 12A of FIG. 1. Path ID field 404 may specify an identifier that uniquely identifies an IP path tunnel, e.g., IP path 16 of FIG. 1. Path ID field 404 may be a 16-bit identifier. Reserved field 406 is a field reserved for additional information for IP object 400.

In some examples, routers may use flow labels to signal explicit IP path tunnels. In such examples, IP object 400 includes flow label field 408 that specifies an identifier allocated by an ingress router and inserted in packets forwarded over the IP path. Flow label field 408 may be a 20-bit identifier. As described above, flow label field 408 may represent a flow label described in RFC 6437 or a flow label described in draft-dreibholz-ipv4-flowlabel-29.

IP object 400 is merely an example. In other examples, IP object 400 may include additional information for a forwarding equivalence class of the IP path, such as the flow specification definition as described in P. Marques, et al., "Dissemination of Flow Specification Rules," Request for Comments 5575, August 2009, the entire contents of which is incorporated by reference herein.

Figure 5:
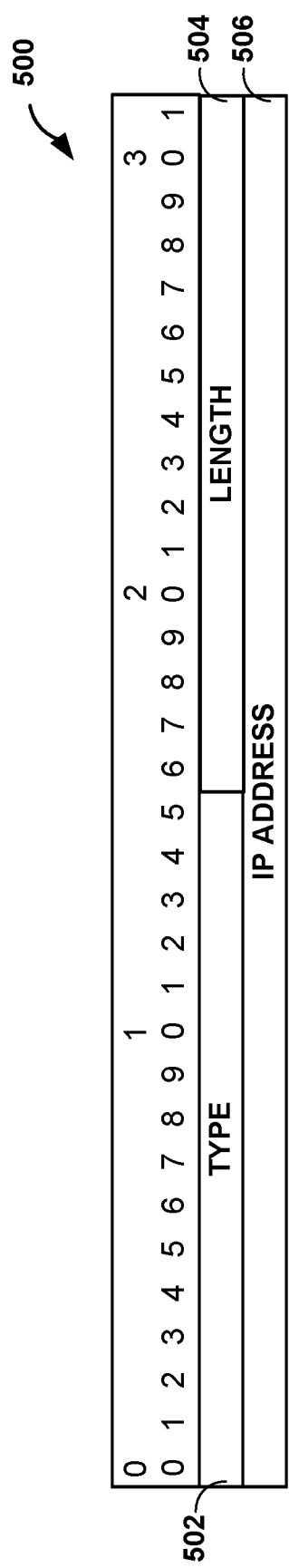
FIG. 5 is a block diagram illustrating another conceptual diagram illustrating an example format of an IP object used for signaling IP path tunnels for traffic engineering using constraints in an IP network, in accordance with one or more aspects of the techniques described in this disclosure.

FIG. 5 is a block diagram illustrating another conceptual diagram illustrating an example format of an IP object used for signaling IP path tunnels for traffic engineering using constraints in an IP network, in accordance with one or more aspects of the techniques described in this disclosure. IP object 500 may represent an IP address type-length-value (TLV) packet that carries one or more IP addresses allocated by an egress router, e.g., egress router 12D of FIG. 1 or 2. For example, an egress router may send an RSVP RESV message including IP object 500. In some examples, IP object 500 is carried in an LSP attributes object of an RSVP RESV message. Additional examples of the LSP attributes object are described in RFC 5420, incorporated above.

IP object 500 may include a Type field 502, Length field 504, and an IP address field 506. Type field 502 may indicate the kind of field that IP address field 506 represents. Length field 504 specifies the size of the IP address field 506. IP address field 506 may specify an IPv4 or IPv6 address allocated by egress router 12D to receive traffic encapsulated with the IP address. For example, the IP address may represent an egress IP address from a set of IP addresses (e.g., Egress Address Block) allocated by the egress router 12D.

Figure 6A:
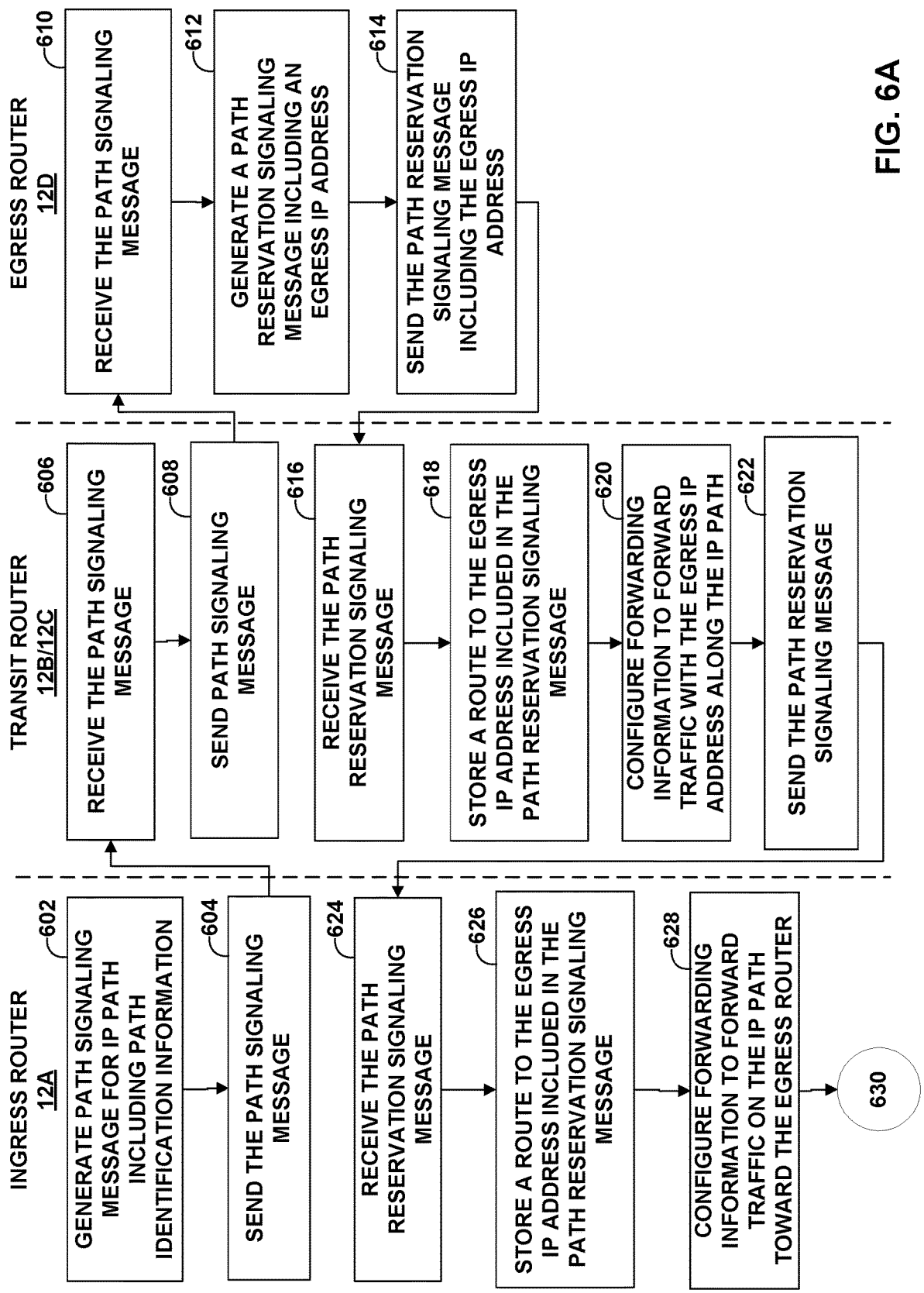
FIGS. 6A-6B is a flowchart illustrating an example operation of signaling IP path tunnels for traffic engineering using constraints in an IP network, in accordance with the techniques described herein.
Figure 6B:
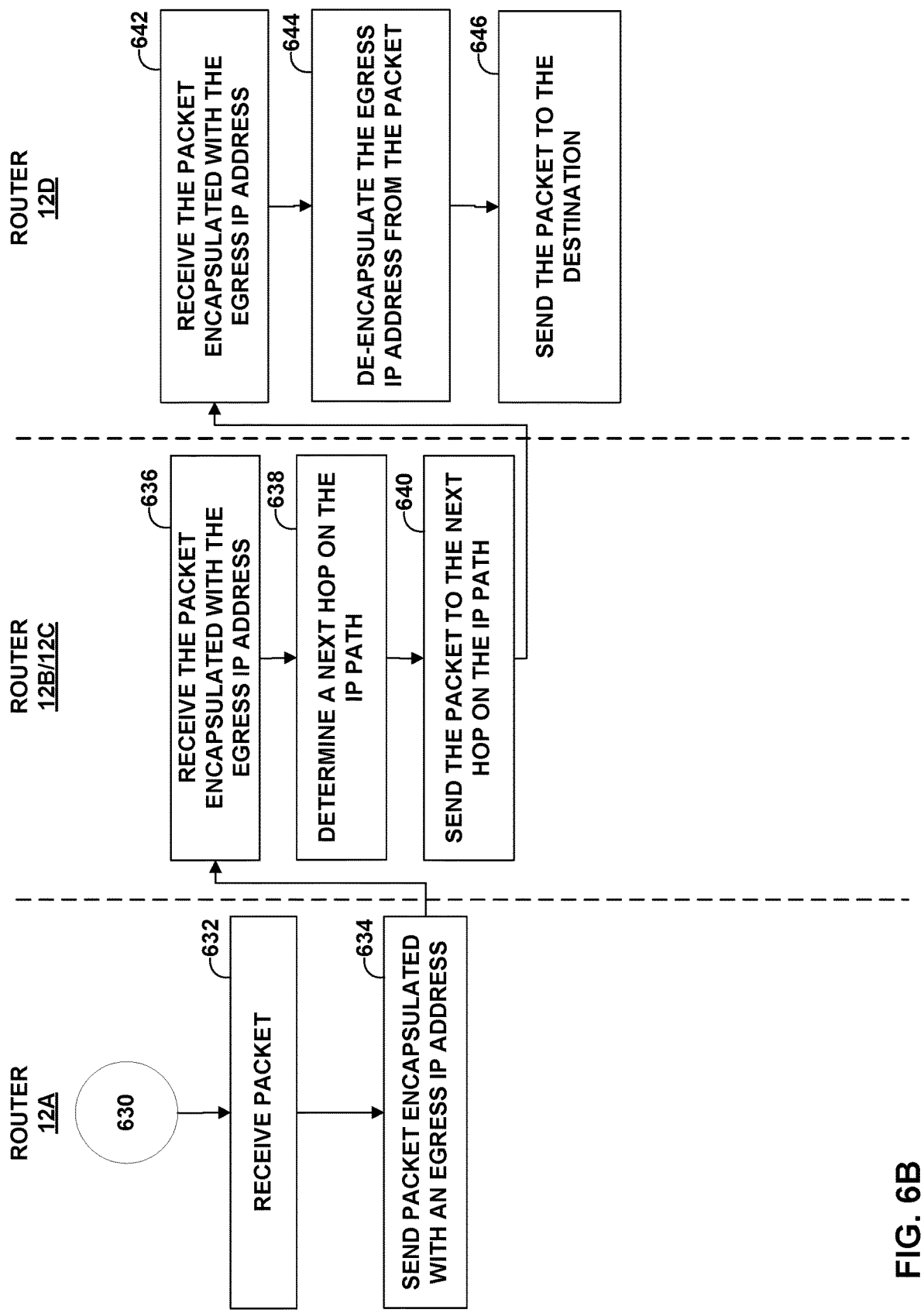

FIGS. 6A-6B are flowcharts illustrating an example operation of signaling IP path tunnels for traffic engineering using constraints in an IP network, in accordance with one or more aspects of the techniques described in this disclosure. FIGS. 6A-6B are described for purposes of example with respect to computer network 2 of FIG. 1, but is equally applicable to the computer network 2 of FIG. 2.

Router 12A compute an IP path having one or more constraints (e.g., bandwidth requests). Router 12A may generate a path signaling message (e.g., RSVP PATH message 22 of FIG. 1) to establish an IP path 16 from an ingress router 12A to an egress router 12D of the IP network (602). For example, ingress router 12A may generate an RSVP PATH message including path identification information associated with IP path 16. As one example, the ingress router 12A may generate path identification information of the RSVP PATH message to include an ERO that specifies the next hop attributes for the IP path. In some examples, ingress router 12A may allocate a flow label for the IP path and generate the RSVP PATH message to include the flow label.

Ingress router 12A may send the path signaling message downstream toward the egress router 12D (604). A transit router, e.g., transit routers 12B or 12C, receives the path signaling message (606). The transit router may compare the bandwidth requested with the bandwidth available on an outgoing link of the transit router, and forwards the RSVP PATH message downstream if the transit router has enough resources for the IP path 16 (608). Egress router 12D receives the path signaling message (610) and generates a path reservation signaling message (e.g., RSVP RESV message 24 of FIG. 1) (612). For example, egress router 12D may allocate a set of IP addresses (egress address block), such as an IP prefix, to enable egress router 12D to receive traffic that is encapsulated with any IP address from the EAB. In some examples, egress router 12D may receive an RSVP PATH message including a flow label, and in response, may generate an RSVP RESV message including the IP address of egress router 12D.

Egress router 12D sends the path reservation signaling message back upstream towards ingress router 12A following the path state created by the path signaling message in reverse order (614). The transit router receives the path reservation signaling message including the egress IP address (616) and stores a route to the egress IP address in its routing information (618). The transit router configures forwarding information to forward a packet encapsulated with the egress IP address on the IP path toward egress router 12D (620). For example, the transit router may use the routing information to generate forwarding information that associates the egress IP address with a specific next hop and corresponding outgoing interface. In some examples, the transit router may configure forwarding information to forward a packet that matches a flow specification filter including a 3-tuple comprising an IP address of the ingress router, the IP address of the egress router, and a flow label. The transit router may determine, based on the ERO that was included in the RSVP PATH message, the next hop for the route and generate forwarding information that associates the 3-tuple of the flow specification filter with a specific next hop and corresponding outgoing interface. The transit router may also reserve bandwidth for an outgoing link. The transit router then sends the path reservation signaling message upstream (622).

Ingress router 12A receives the path reservation signaling message (624) and stores a route the egress IP address in its routing information (626). Ingress router 12A configures forwarding information of the ingress router to forward a packet on the IP path toward the egress router 12D (628). For example, ingress router 12A may use the routing information to generate forwarding information that associates the egress IP address with a specific next hop and corresponding outgoing interface. Ingress router 12A may also generate forwarding information to encapsulate a packet with the egress IP address as a packet header to steer the packet along the IP path toward egress router 12D. Additionally, or alternatively, ingress router 12A may configure forwarding information to encapsulate the egress IP address and a flow label allocated by the ingress router 12A to an outgoing packet.

When the ingress router 12A receives a packet (e.g., packet 26 of FIG. 1) from a source network (e.g., customer network 6A) and destined for a destination network (e.g., customer network 6B) (632), the ingress router 12A may inject packet 26 into the IP network 14 with the egress IP address as a packet header 28 to packet 26, to steer packet 26 along IP path 16 (634). Additionally, or alternatively, ingress router 12A may encapsulate the egress IP address and a flow label associated with the IP path to cause the routers in the IP path to forward the packet on the IP path toward egress router 12D.

When the transit router receives the packet (636), the transit router determines a next hop for the IP path (638). For example, the transit router performs a lookup of its forwarding information based on the egress IP address (and in some instances the 3-tuple flow specification filter) specified in the packet header and determines the outgoing interface used to forward the packet to the next hop. The transit router sends the packet to the next hop on the IP path (640).

When egress router 12D receives the packet (642), egress router 12D may de-encapsulate the packet header with the egress IP address from the packet (644) and sends the packet toward the destination (646).

Figure 7:
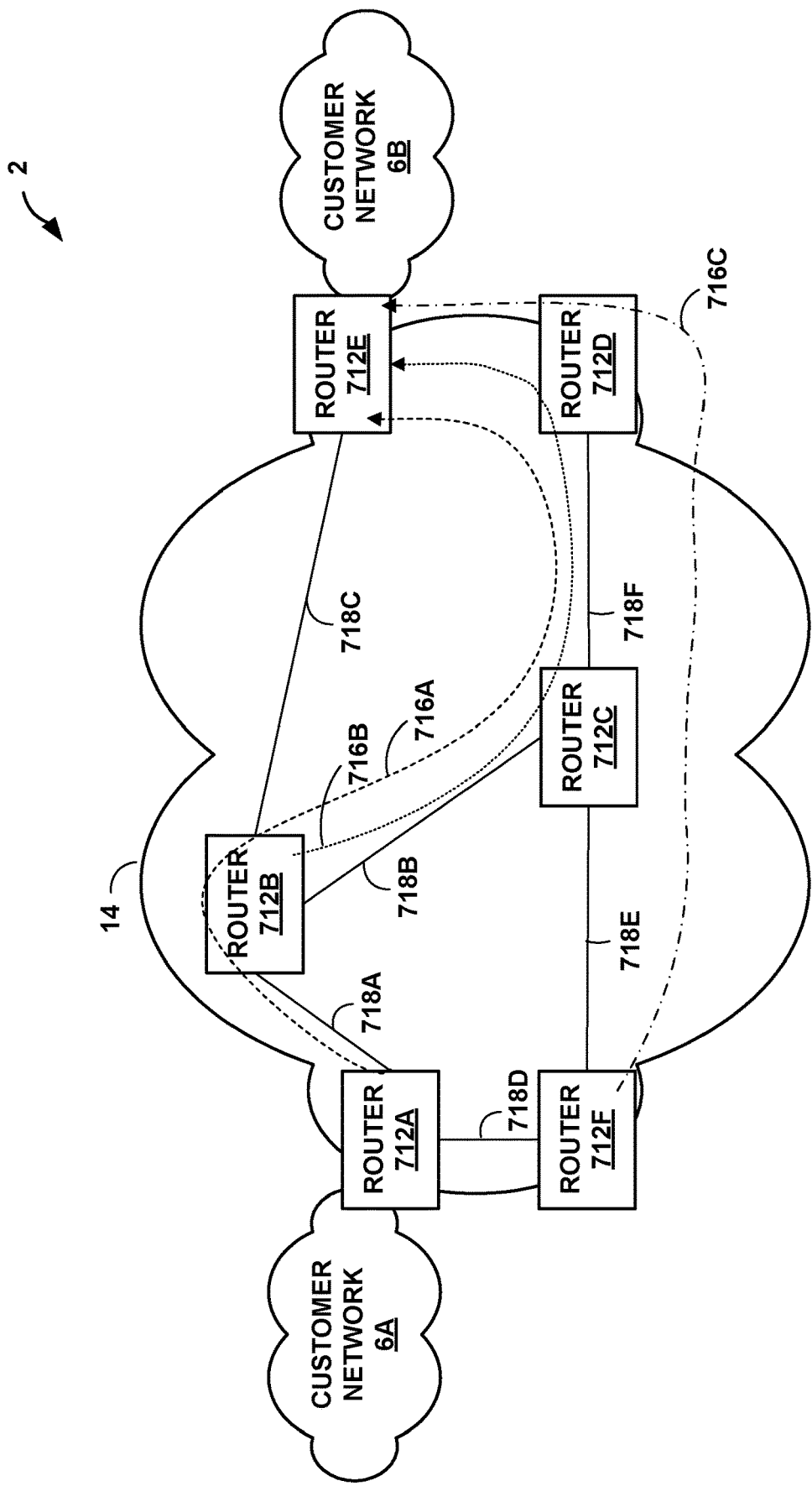
FIG. 7 is a block diagram illustrating another example network system in which network devices perform forwarding information sharing, in accordance with one or more aspects of the techniques described in this disclosure.

FIG. 7 is a block diagram illustrating another example network system in which network devices perform forwarding information sharing, in accordance with one or more aspects of the techniques described in this disclosure. In the illustrated example of FIG. 7, routers 712A-712F (collectively, "routers 712") may provide multipoint-to-point path sharing. For example, IP paths, e.g., 716A-716C (collectively, "IP paths 716") may share forwarding information (e.g., same EAB address) if the IP paths 716 share a full path (after merging) towards the destination, e.g., egress router 712E, after the IP paths merge.

Egress router 712E may identify merged paths (otherwise referred to herein as "shared paths") based on a recorded path during signaling (e.g., an RSVP Record Route Object (RRO)) and assigns the same egress address block for each path. In this example, egress router 712E may determine from the RRO of each of the signaled IP paths 716 that IP path 716B shares a path from routers 712B-712E with IP path 716A, and that IP path 716C shares a path from routers 712C-712E with IP paths 716A and 716B.

Egress router 712E may assign the same egress address to IP Paths 716A, 716B, and 716C. For example, router 712C may receive the same EAB address during reservation signaling (e.g., RSVP RESV) of each IP Path and can configure a shared forwarding information for IP Paths 716 to forward traffic arriving on any of IP Paths 716 to be forwarded to the same next hop, e.g., router 712D, along the shared IP path toward egress router 712E. Egress router 712E may keep track of which EAB addresses are assigned to which of the IP paths. As one example, egress router 712E may use Patricia-based trees (or other radix trees) to identify which paths are merged and can therefore determine which can share an EAB address.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
sending, by a network device of a plurality of network devices of an Internet Protocol (IP) network, a path signaling message of a resource reservation protocol toward an egress network device of the IP network to establish an IP path in the IP network, wherein the path signaling message includes path identification information associated with the IP path that causes the plurality of network devices to steer traffic on the IP path, wherein the path identification information comprises an Explicit Route Object that specifies one or more transit network devices of the plurality of network devices for the IP path, and one or more traffic characteristics of the IP path;
receiving, by the network device, a path reservation signaling message of the resource reservation protocol including an IP address of the egress network device; and
configuring, by the network device and in response to receiving the path reservation signaling message, forwarding information of the network device to forward, without using Multi-Protocol Label Switching (MPLS), a packet encapsulated with the IP address of the egress network device on the IP path toward the egress network device.

2. The method of claim 1, wherein the network device is operating as an ingress network device of the IP network, the method further comprising:
generating, by the ingress network device, the path signaling message to establish the IP path from the ingress network device to the egress network device of the IP network.

3. The method of claim 2, further comprising:
receiving, by the ingress network device, the packet from a source network and destined for a destination network;
performing, by the ingress network device, a lookup of forwarding information to determine the egress network device of the IP network;
encapsulating, by the ingress network device, the packet using the IP address of the egress network device as a packet header to the packet; and
sending, by the ingress network device, the packet on the IP path toward the egress network device.

4. The method of claim 1,
wherein the path signaling message comprises a resource reservation protocol (RSVP) path message, and
wherein the path reservation signaling message comprises an RSVP reservation message.

5. The method of claim 4, wherein the path reservation signaling message comprises a Type-Length-Value (TLV) object of the RSVP reservation message that specifies the IP address of the egress network device.

6. The method of claim 1, wherein the path identification information further comprises an identifier for the IP path.

7. The method of claim 1, wherein the path identification information comprises a flow label associated with the IP path, the method further comprising:
receiving, by the network device, the flow label; and
configuring, by the network device, a flow specification filter that causes the network device to forward the packet that matches the flow specification filter on the IP path, wherein the flow specification filter comprises an address of an ingress network device, an address of the egress network device, and the flow label.

8. The method of claim 1, wherein the path identification information comprises a flow label associated with the IP path, wherein the network device is operating as an ingress network device of the IP network, the method further comprising:
receiving, by the ingress network device, the packet from a source network and destined for a destination network;
performing, by the ingress network device, a lookup of forwarding information to determine the egress network device of the IP network;
encapsulating, by the ingress network device, the packet using the IP address of the egress network device and the flow label as a packet header to the packet; and
sending, by the ingress network device, the packet on the IP path toward the egress network device.

9. The method of claim 1, wherein the IP address of the egress network device is selected from a set of IP addresses allocated by the egress network device, wherein the IP address of the egress network device is unique to the IP path.

10. The method of claim 1, wherein the path signaling message comprises a first path signaling message, wherein the path reservation signaling message comprises a first path reservation signaling message, the method further comprising:
generating, by a point of local repair network device of a subset of the plurality of network devices, a second path signaling message to establish a bypass path to protect a portion of the IP path from the point of local repair network device to a merge point network device of the subset of the plurality of network devices of the IP path, wherein the second path signaling message includes path identification information associated with the bypass path that causes the subset of the plurality of network devices to establish the bypass path;
sending, by the point of local repair network device and to the merge point network device that merges the bypass path with the IP path, the second path signaling message toward the merge point network device;
receiving, by the point of local repair network device, a second path reservation signaling message including an IP address of the merge point network device;
detecting, by the point of local repair network device, a link failure on the IP path; and
configuring, by the ingress network device and in response to detecting the link failure, a forwarding state of the ingress network device to forward the packet on the bypass path toward the egress network device.

11. The method of claim 10, further comprising;
receiving, by the point of local repair network device and from an upstream router of the IP path, a packet encapsulated with the IP address of the egress network device as a first packet header to the packet; and
encapsulating, by the point of local repair network device, the encapsulated packet using the IP address of the merge point network device as a second packet header to the packet to steer the packet to the merge point network device.

12. A network device of an Internet Protocol (IP) network comprising:
a memory; and
one or more processors in communication with the memory, wherein the one or more processors are configured to:
send a path signaling message of a resource reservation protocol toward an egress network device of the IP network to establish an IP path in the IP network, wherein the path signaling message includes path identification information associated with the IP path that causes a plurality of network devices of the IP network to steer traffic on the IP path, wherein the path identification information comprises an Explicit Route Object that specifies one or more transit network devices of the plurality of network devices for the IP path, and one or more traffic characteristics of the IP path;
receive a path reservation signaling message of the resource reservation protocol including an IP address of the egress network device; and
configure, in response to receiving the path reservation signaling message, forwarding information of the network device to forward, without using Multi-Protocol Label Switching, a packet encapsulated with the IP address of the egress network device on the IP path toward the egress network device.

13. The network device of claim 12, wherein the network device is operating as an ingress network device of the IP network, wherein the one or more processors are further configured to:

generate the path signaling message to establish the IP path from an ingress network device to the egress network device of the IP network.

14. The network device of claim 13, wherein the one or more processors are further configured to:
receive the packet from a source network and destined for a destination network;
perform a lookup of forwarding information to determine the egress network device of the IP network;
encapsulate the packet using the IP address of the egress network device as a packet header to the packet; and
send the packet on the IP path toward the egress network device.

15. The network device of claim 12,
wherein the path signaling message comprises a resource reservation protocol (RSVP) path message, and
wherein the path reservation signaling message comprises an RSVP reservation message.

16. The network device of claim 12, wherein the path identification information further comprises an identifier for the IP path.

17. The network device of claim 12, wherein the path identification information comprises a flow label associated with the IP path, wherein the one or more processors are further configured to:
receive the flow label; and
configure a flow specification filter that causes the network device to forward the packet that matches the flow specification filter on the IP path, wherein the flow specification filter comprises an address of an ingress network device, an address of the egress network device, and the flow label.

18. The network device of claim 12, wherein the path identification information comprises a flow label associated with the IP path, wherein the network device is operating as an ingress network device of the IP network, wherein the one or more processors are further configured to:
receive the packet from a source network and destined for a destination network;
perform a lookup of forwarding information to determine the egress network device of the IP network;
encapsulate the packet using the IP address of the egress network device and the flow label as a packet header to the packet; and
send the packet on the IP path toward the egress network device.

19. A method comprising:
receiving, by an egress network device of a plurality of network devices of an Internet Protocol (IP) network, a path signaling message to establish an IP path from an ingress network device of the IP network to the egress network device, wherein the path signaling message includes path information associated with the IP path that causes one or more transit network devices of the plurality of network devices to establish the IP path, wherein the path identification information comprises an Explicit Route Object that specifies one or more transit network devices of the plurality of network devices for the IP path, and one or more traffic characteristics of the IP path;
generating, by the egress network device, a path reservation signaling message including an IP address of the egress network device selected from a set of IP addresses and assigned to the IP path; and
sending, by the egress network device, the path reservation signaling message and to the one or more of the transit network devices to cause each of the one or more transit network devices and the ingress network device to configure a forwarding state to forward, without using Multi-Protocol Label Switching, a packet encapsulated with the IP address of the egress network device on the IP path toward the egress network device.

20. The method of claim 19, wherein the IP path comprises a first IP path, wherein the path signaling message includes a record route object to record the plurality of network devices that establish the first IP path, the method further comprising:
determining, by the egress network device and based on the record route object, that the first IP path includes a shared path with a second IP path to the egress network device; and
assigning, by the egress network device and in response to determining that the first IP path shares a sub-path with a second IP path to the egress network device, the IP address of the egress network device to cause a network device of the plurality of network devices that is along the shared sub-path of the first IP path and the second IP path to configure a shared forwarding state for the first IP path and the second IP path and to forward the packet on the shared sub-path toward the egress network device.

* * * * *